US012748851B2

(12) United States Patent
Young et al.

(10) Patent No.: US 12,748,851 B2
(45) Date of Patent: Sep. 29, 2026

(54) CORRECTION OF NON-COMPLIANT FILES IN A CODE REPOSITORY

(71) Applicant: Capital One Services, LLC, McLean, VA (US)

(72) Inventors: Danrisha Young, Davenport, FL (US); Keshab Budhathoky, Glen Allen, VA (US); Lydia Yu, Austin, TX (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 613 days.

(21) Appl. No.: 17/811,727

(22) Filed: Jul. 11, 2022

(65) Prior Publication Data

US 2024/0012909 A1 Jan. 11, 2024

(51) Int. Cl.
*G06F 21/57* (2013.01)
*G06F 8/75* (2018.01)

(52) U.S. Cl.
CPC .............. *G06F 21/577* (2013.01); *G06F 8/75* (2013.01)

(58) Field of Classification Search
CPC .... G06F 21/577; G06F 21/6218; G06F 21/44; G06F 21/552; G06F 21/563; G06N 20/00; H04L 63/20; H04L 63/1433; H04L 63/10; H04L 63/1408
See application file for complete search history.

(56) References Cited

U.S. PATENT DOCUMENTS

| | | | |
|---|---|---|---|
| 10,255,370 B2 | 4/2019 | Carpenter et al. | |
| 10,872,029 B1 | 12/2020 | Bawcom | |
| 11,586,437 B1 * | 2/2023 | Tripp | G06F 9/54 |
| 2017/0026416 A1 * | 1/2017 | Carpenter | H04L 41/0866 |
| 2019/0347424 A1 | 11/2019 | Bezzi et al. | |
| 2020/0301672 A1 * | 9/2020 | Li | G06F 11/3698 |
| 2022/0198044 A1 * | 6/2022 | Madhavan | G06Q 50/265 |

OTHER PUBLICATIONS

Dai, T., et al., "Automatically Detecting Risky Scripts in Infrastructure Code," Proceedings of the 11th ACM Symposium on Cloud Computing, Oct. 12, 2020, pp. 358-371.

International Search Report and Written Opinion for Application No. PCT/US2023/068881, mailed on Oct. 13, 2023, 13 Pages.

* cited by examiner

*Primary Examiner* — Beemnet W Dada
*Assistant Examiner* — Sayeda Salma Nahar
(74) *Attorney, Agent, or Firm* — Harrity & Harrity, LLP

(57) ABSTRACT

In some implementations, a device may perform a scan of a content of one or more files in a code repository for violations of one or more compliance rules, where the one or more files indicate a configuration for infrastructure to be provisioned in a cloud computing environment. The device may identify that the content of the one or more files includes at least one violation of the one or more compliance rules. The device may modify the content of the one or more files to correct the at least one violation in accordance with the one or more compliance rules. The device may determine a probability as to whether a build of code of the code repository, using the one or more files with the content modified, is likely to pass. The device may transmit a request to merge the one or more files into the code repository.

20 Claims, 7 Drawing Sheets

CORRECTION OF NON-COMPLIANT FILES IN A CODE REPOSITORY

BACKGROUND

Infrastructure as code (IaC) uses machine-readable definition files, rather than physical hardware configurations or interactive configuration tools, for managing and provisioning computer data centers. Continuous configuration automation can leverage IaC to automate the deployment and configuration of settings of data center infrastructure.

SUMMARY

Some implementations described herein relate to a system for correction of non-compliant files in a code repository. The system may include one or more memories and one or more processors communicatively coupled to the one or more memories. The one or more processors may be configured to obtain first information relating to a code repository that includes one or more files that indicate a configuration for infrastructure that is to be provisioned in a cloud computing environment. The one or more processors may be configured to obtain second information relating to one or more compliance rules for provisioning the infrastructure in the cloud computing environment. The one or more processors may be configured to perform a scan of a content of the one or more files for violations of the one or more compliance rules. The scan may use natural language processing to identify at least one of a cloud computing provider for the cloud computing environment or a programming language used in the one or more files. The one or more processors may be configured to identify, in connection with the scan of the content of the one or more files and based on the at least one of the cloud computing provider or the programming language, that the content of the one or more files includes at least one violation of the one or more compliance rules. The one or more processors may be configured to modify the content of the one or more files to correct the at least one violation in accordance with the one or more compliance rules. The one or more processors may be configured to transmit a request to merge the one or more files into the code repository. The one or more processors may be configured to determine, using a machine learning model and based on the at least one violation, a severity of the at least one violation. The one or more processors may be configured to transmit, to a user device associated with a user of the code repository, a notification indicating the severity of the at least one violation.

Some implementations described herein relate to a method of correction of non-compliant files in a code repository. The method may include performing, by a device, a scan of a content of one or more files in a code repository for violations of one or more compliance rules, where the one or more files indicate a configuration for infrastructure that is to be provisioned in a cloud computing environment. The method may include identifying, by the device in connection with the scan of the content of the one or more files, that the content of the one or more files includes at least one violation of the one or more compliance rules. The method may include modifying, by the device, the content of the one or more files to correct the at least one violation in accordance with the one or more compliance rules. The method may include determining, by the device using a machine learning model, a probability as to whether a build of code of the code repository, using the one or more files with the content that is modified, is likely to pass. The method may include transmitting, by the device based on the probability that the build of code of the code repository is likely to pass, a request to merge the one or more files into the code repository.

Some implementations described herein relate to a non-transitory computer-readable medium that stores a set of instructions for correction of non-compliant files in a code repository for a device. The set of instructions, when executed by one or more processors of the device, may cause the device to perform a scan of a content of one or more files in a code repository for violations of one or more compliance rules. The one or more files may indicate a configuration for infrastructure that is to be provisioned in a cloud computing environment. The scan may use natural language processing to identify at least one of a cloud computing provider for the cloud computing environment or a programming language used in the one or more files. The set of instructions, when executed by one or more processors of the device, may cause the device to identify, in connection with the scan of the content of the one or more files and based on the at least one of the cloud computing provider or the programming language, that the content of the one or more files includes at least one violation of the one or more compliance rules. The set of instructions, when executed by one or more processors of the device, may cause the device to modify the content of the one or more files to correct the at least one violation in accordance with the one or more compliance rules. The set of instructions, when executed by one or more processors of the device, may cause the device to transmit a request to merge the one or more files into the code repository.

DETAILED DESCRIPTION

Figure 1A:
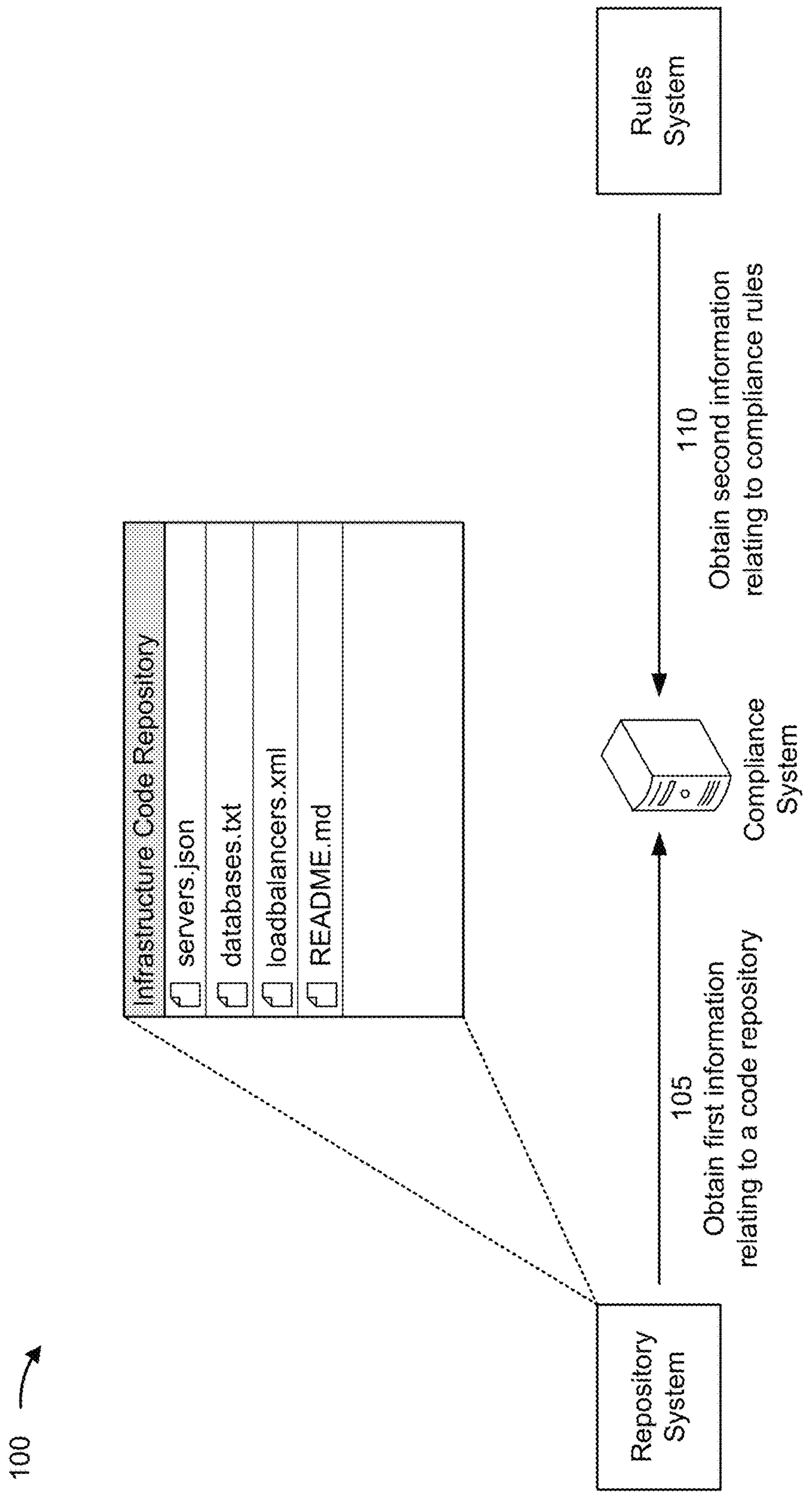
FIGS. 1A-1D are diagrams of an example associated with correction of non-compliant files in a code repository, in accordance with some embodiments of the present disclosure.

The following detailed description of example implementations refers to the accompanying drawings. The same reference numbers in different drawings may identify the same or similar elements.

A cloud computing provider may provide a set of cloud computing services to an entity (e.g., a company, an organization, or an institution) via a cloud computing environment. The cloud computing environment may provide the functionality of one or more physical computers, such as by using emulation of hardware and/or software that may be implemented in a physical computer. The entity that uses the cloud computing services may provision one or more virtual machines (e.g., a virtual representation of a physical computer), serverless computing functions, load balancers, volumes, databases, or the like, in the cloud computing environment. These provisioned components of the cloud computing environment may be referred to as "infrastructure."

A configuration for the infrastructure may be indicated in one or more definition files. Accordingly, to provision the infrastructure, the configuration may be read from the one or more definition files and communicated to the cloud computing provider (e.g., using an application programming interface (API)) for deployment in the cloud computing environment. An infrastructure configuration that is defined by code in one or more files may be referred to as "infrastructure as code" (IaC). Often, the entity that uses the cloud computing services may have a set of compliance rules for provisioning the infrastructure in the cloud computing environment. The compliance rules may be intended to provide data security, interoperability, compatibility, and/or may relate to other best practices.

In some cases, the infrastructure provisioned in the cloud computing environment may be analyzed to identify violations of the compliance rules, and the infrastructure may be reconfigured to correct the violations and reprovisioned in the cloud computing environment. However, this analysis, reconfiguration, and reprovisioning unnecessarily uses or allocates cloud computing resources (e.g., processing resources, memory resources, communication resources, and/or power resources, among other examples). Moreover, such a reactive approach may allow violations of the compliance rules to persist in a production environment for a period of time before the violations are corrected, thereby impairing a security of the infrastructure and/or a stability of the infrastructure.

Some implementations described herein provide for proactive detection and correction of non-compliant infrastructure. For example, detection and correction of the non-compliant infrastructure may be performed on files in a code repository that define a configuration for the infrastructure (e.g., IaC files) before the infrastructure is provisioned in a cloud computing environment. In some implementations, a system may perform a scan of a content of files in a code repository for violations of compliance rules. The system may identify violations of the compliance rules and automatically modify the content of the files to correct the violations in accordance with the compliance rules.

In this way, violations of the compliance rules may be corrected before the infrastructure is provisioned in the cloud computing environment. Accordingly, this may allow cloud computing resources, that could otherwise be used to provide, detect, and correct non-compliant infrastructure, to be conserved. This may improve a performance of the cloud computing resources. Moreover, by proactively detecting and correcting non-compliant infrastructure before the infrastructure is provisioned in the cloud computing environment, a security of the infrastructure and/or a stability of the infrastructure is improved.

FIGS. 1A-1D are diagrams of an example 100 associated with correction of non-compliant files in a code repository. As shown in FIGS. 1A-1D, example 100 includes a compliance system, a repository system, and a rules system. These devices are described in more detail in connection with FIGS. 2 and 3. The repository system may include (e.g., store or host) one or more code repositories (also known as "software repositories") of an entity. One or more of the code repositories may include one or more files that indicate a configuration for infrastructure that is to be provisioned in a cloud computing environment. In particular, one or more of the code repositories may include one or more infrastructure as code (IaC) definition files. The definition file(s) may include IaC definitions. For example, the definition file(s) may identify an infrastructure configuration using code expressions, arguments, statements, or the like. The definition file(s) may identify the infrastructure configuration using declarative code (e.g., the definition files(s) identify what the infrastructure configuration is to be) and/or imperative code (e.g., the definition file(s) identify infrastructure changes needed to achieve the infrastructure configuration).

As shown in FIG. 1A, and by reference number 105, the compliance system may obtain first information relating to a code repository (e.g., one or more code repositories). For example, the compliance system may obtain the first information from the repository system. As described above, the code repository may include files (e.g., files containing code) that indicate a configuration for infrastructure that is to be provisioned in a cloud computing environment. The infrastructure may include a server (e.g., a virtual server), a serverless computing function, a load balancer, a volume, and/or a database, among other examples.

The first information may indicate a name of the code repository, a location of the code repository (e.g., a uniform resource locator (URL) for the code repository), a developer team that uses the code repository, an email address for a contact of the developer team, and/or a list of files in the code repository that are to be scanned and/or not scanned by the compliance system. Based on obtaining the first information, the compliance system may add the code repository (e.g., using the first information) to a registry of the compliance system. The registry may indicate code repositories that are to be scanned by the compliance system, as described herein.

In some implementations, the compliance system may obtain the first information responsive to receiving a request (e.g., from a user) to add the code repository to the registry of the compliance system. In some implementations, the compliance system may monitor the repository system for creation of new code repositories, such as a new code repository associated with a name that includes a particular text string (e.g., "infrastructure") and/or associated with a particular developer team. For example, based on the monitoring, the compliance system may detect creation of the code repository and obtain the first information responsive to detecting creation of the code repository. In some implementations, creation of the code repository may automatically cause the request to be sent to the compliance system (e.g., if the name of the code repository includes the particular text string and/or if the code repository is associated with the particular developer team).

As shown by reference number 110, the compliance system may obtain second information relating to one or more compliance rules for provisioning the infrastructure in the cloud computing environment. That is, the second information may indicate the compliance rule(s). The compliance system may obtain the second information from the rule system. For example, the compliance system may transmit a request (e.g., via an API) for the compliance rule(s) to the rules system, and the compliance system may receive a response from the rules system that indicates the second information relating to the compliance rule(s).

The compliance rule(s) may be defined by the entity, one or more standards bodies, and/or one or more cloud computing providers among other examples. In one example, a compliance rule may indicate that a security group is to be referenced in code using an up-to-date release version for the security group. Additionally, or alternatively, a compliance rule may indicate that a secret key for encryption is not to be included in code. Additionally, or alternatively, a compliance rule may indicate a formatting for a machine image. The foregoing compliance rules are provided as examples, and the one or more compliance rules may include additional and/or different compliance rules than the examples provided herein.

The compliance system may store the compliance rules in a database or another data structure. In some implementations, the compliance rules may be updated (e.g., added and/or deleted) by an administrator of the compliance system. In some implementations, the compliance system may automatically update the compliance rules. For example, the compliance system may monitor (e.g., using natural language processing (NLP)) documents, webpages, and/or other informational sources of the entity, a standards body, and/or a cloud computing provider to identify compliance rules, and based on identifying a compliance rule, the compliance system may automatically update the compliance rules.

Figure 1B:
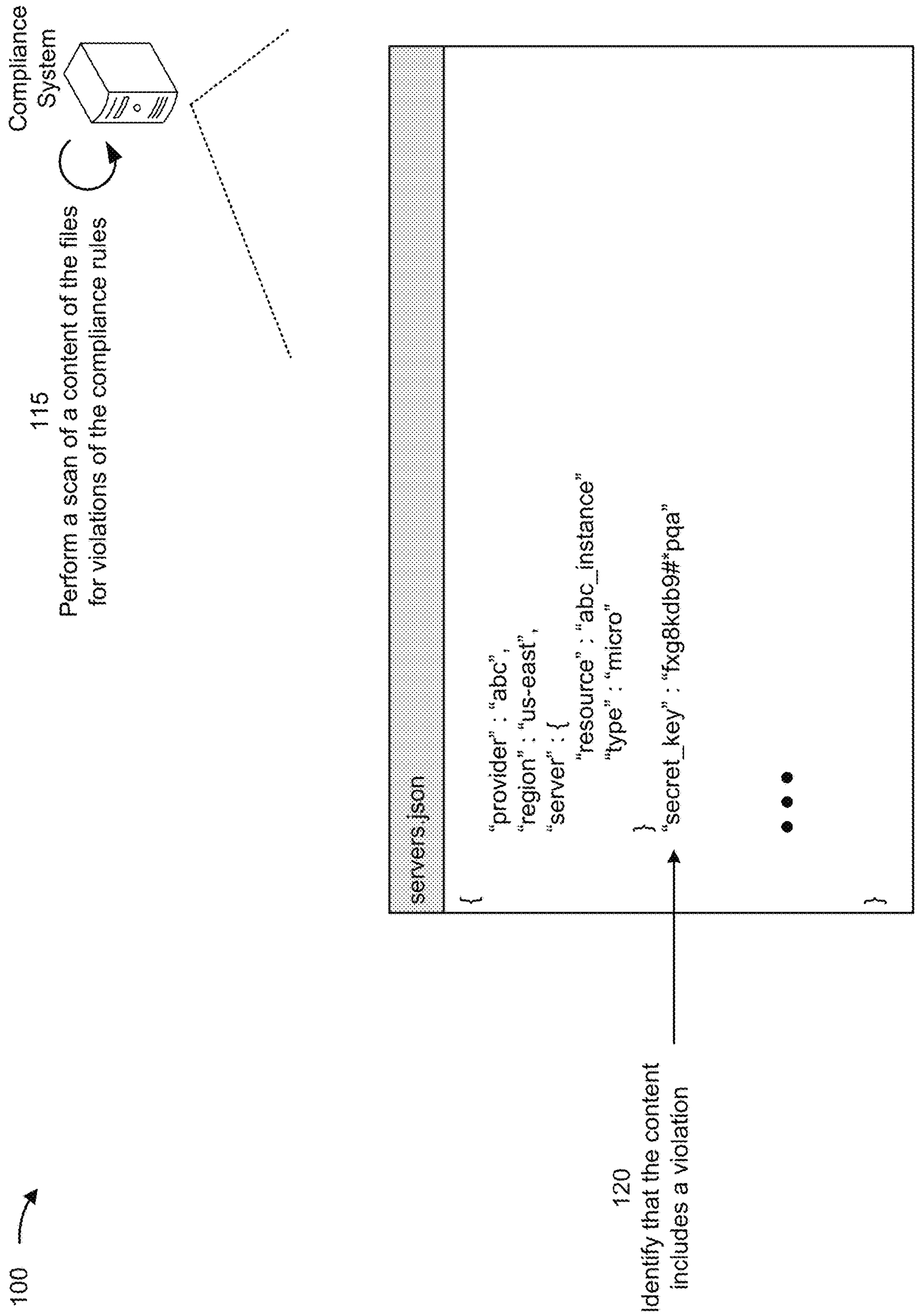

As shown in FIG. 1B, and by reference number 115, the compliance system may perform a scan of a content of the one or more files of the code repository for violations of the one or more compliance rules (e.g., for non-compliant cloud resource references). That is, the compliance system may perform validation of the one or more files based on the one or more compliance rules. The scan of the content of the one or more files may include processing the content one or more times. The compliance system may perform a scan of each code repository in the registry of the compliance system for violations of the one or more compliance rules. That is, the compliance system may scan multiple files across multiple code repositories associated with the entity. In some implementations, multiple files (e.g., included in the same code repository or in different code repositories), including a first file and a second file, may be scanned by the compliance system, and a file type of the first file may be different from a file type of the second file. Thus, the compliance system is capable of identifying violations of the compliance rules across file types, thereby improving a likelihood that violations will be detected.

In some implementations, the scan performed by the compliance system may use NLP to identify a cloud computing provider for the cloud computing environment and/or to identify a programming language used for the file(s). The identity of the cloud computing provider and/or the programming language may facilitate identification of violations of the one or more compliance rules. For example, based on the identity of the cloud computing provider and/or the programming language, the compliance system may determine a parsing scheme (e.g., in accordance with a formatting of the file(s) or a syntax used in the file(s)) for scanning the file(s) to facilitate identification of violations of the one or more compliance rules. As an example, if the compliance system identifies a first cloud computing provider and/or a first programming language, then the compliance system may determine that a first parsing scheme is to be used to scan the file(s), and if the compliance system identifies a second cloud computing provider and/or a second programming language, then the compliance system may determine that a second parsing scheme is to be used to scan the file(s). A parsing scheme may indicate naming conventions, array keys, markup tags, data formats, or the like, for a particular cloud computing provider and/or programming language. Accordingly, the compliance system may perform the scan using the parsing scheme that is determined.

As shown by reference number 120, the compliance system may identify that the content of the file(s) includes at least one violation of the one or more compliance rules (e.g., the content of the file(s) includes non-compliant cloud resource references). For example, the compliance system may identify the at least one violation in connection with the scan of the content of the file(s) and based on the cloud computing provider and/or the programming language. The at least one violation may be in a text string, a line of code, or the like, of the content of the file(s). In some implementations, the at least one violation may be a reference to a security group in the file(s) using an outdated release version of the security group. Additionally, or alternatively, the at least one violation may be inclusion in the file(s) of a secret key for encryption. Additionally, or alternatively, the at least one violation may be incorrect formatting of a machine image of the file(s).

Figure 1C:
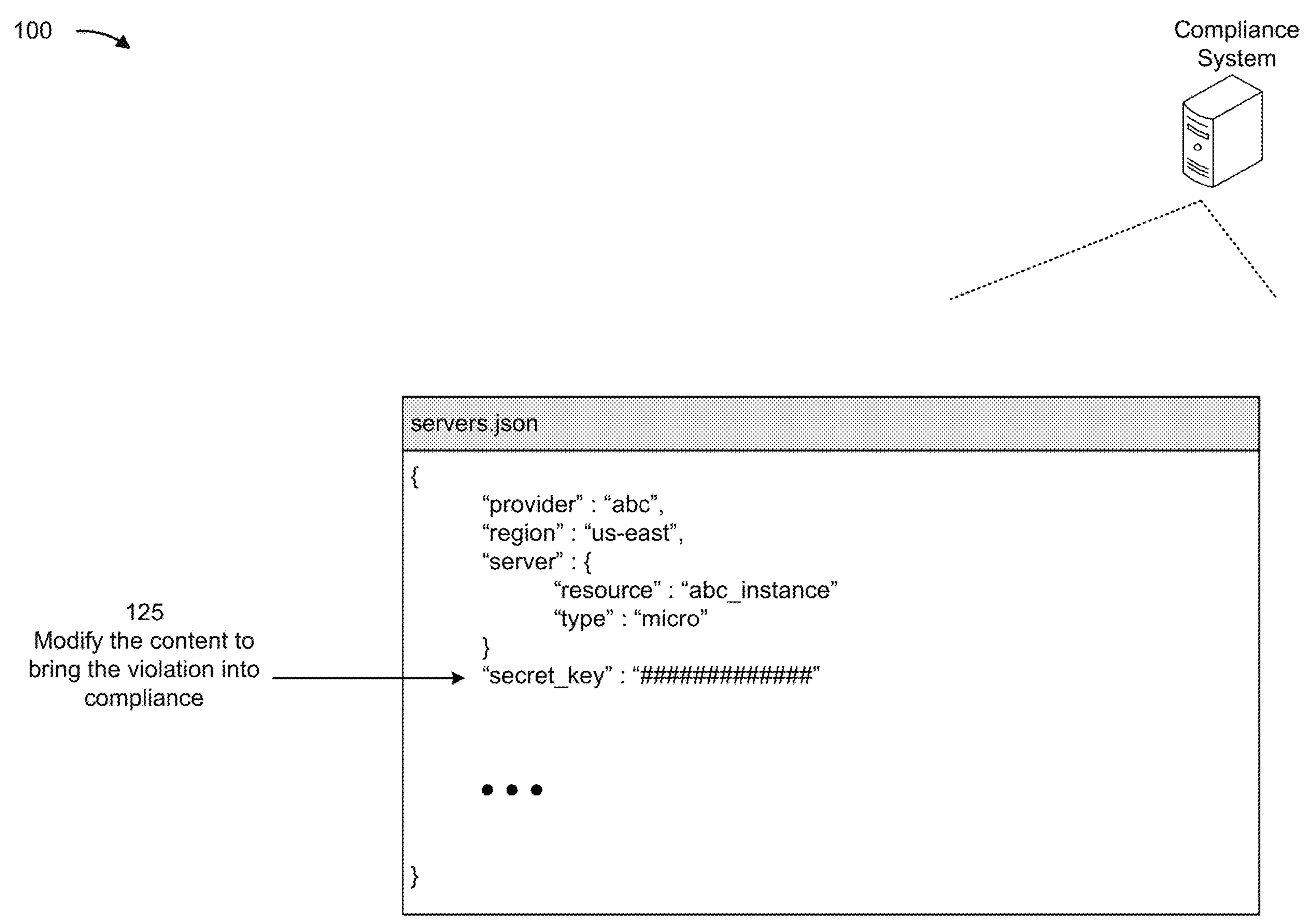

As shown in FIG. 1C, and by reference number 125, the compliance system may modify the content of the file(s) to correct the at least one violation in accordance with the one or more compliance rules. In some implementations, to modify the content, the compliance system may delete a portion (e.g., a text string or a line of code) of the content associated with the at least one violation. In some implementations, to modify the content, the compliance system may determine a change to the portion of the content that brings the at least one violation into compliance with the one or more compliance rules. For example, the change may be masking the portion of the content, editing the portion of the content, or rearranging the portion of the content. Moreover, based on determining the change, the compliance system may modify the portion of the content in accordance with the change.

To modify the content (e.g., by deleting a portion of the content or changing a portion of the content), the compliance system may create, or cause creation of, a copy of the file(s). For example, the compliance system may create, or cause creation of, a clone of the code repository (e.g., in the repository system) that includes a copy of the file(s). Accordingly, to modify the content, the compliance system may modify the copy of the file(s), as described herein.

In some implementations, the compliance system may determine a probability as to whether a build of the code of the code repository is likely to pass (or fail) if the modified file(s) are used. Whether the build of the code is likely to pass may indicate whether the modified file(s) should be implemented in a production environment. The compliance system may determine the probability as to whether the build of the code is likely to pass by using a machine learning model. The machine learning model may be trained to determine the probability as to whether the build of the code is likely to pass based on historical data indicating whether previous builds of code (e.g., of the one or more files of the code repository and/or of other files in the code repository or in other code repositories) have passed or failed. Accordingly, the compliance system may provide the modified file(s) or the entire code repository to the machine learning model as an input, and the machine learning model may output an indication of the probability as to whether the build of the code is likely to pass. The indication may be, for instance, a score indicating the probability, a percentage of the likelihood, a classification indicating the likelihood ("not likely to pass," "likely to pass," etc.), or any other similar notification.

The compliance system may discard the modified file(s) based on a determination that the build of the code of the repository is not likely to pass. In some implementations, the compliance system may determine a recommendation of a modification to the content of the file(s) (e.g., to improve a probability that the build will pass). For example, the compliance system may determine the recommendation of the modification using a machine learning model (e.g., the same machine learning model used to determine whether the build of the code is likely to pass or a different machine learning model). The machine learning model may be trained to determine the modification based on historical data indicating whether previous builds of code (e.g., of the one or more files of the code repository and/or of other files in the code repository or in other code repositories) have passed or failed. Thus, the recommendation of the modification may indicate changes to the content of the file(s) that improves a probability that a build with the file(s) will pass. Based on determining the recommendation of the modification, the compliance system may transmit a notification indicating the recommendation of the modification. The compliance system may transmit the notification to a user device. The user device may be associated with a user (e.g., a developer, a manager, a custodian, or the like) associated with the code repository. In some implementations, the compliance system may automatically implement the recommendation of the modification (e.g., without notifying the user or receiving approval).

Figure 1D:
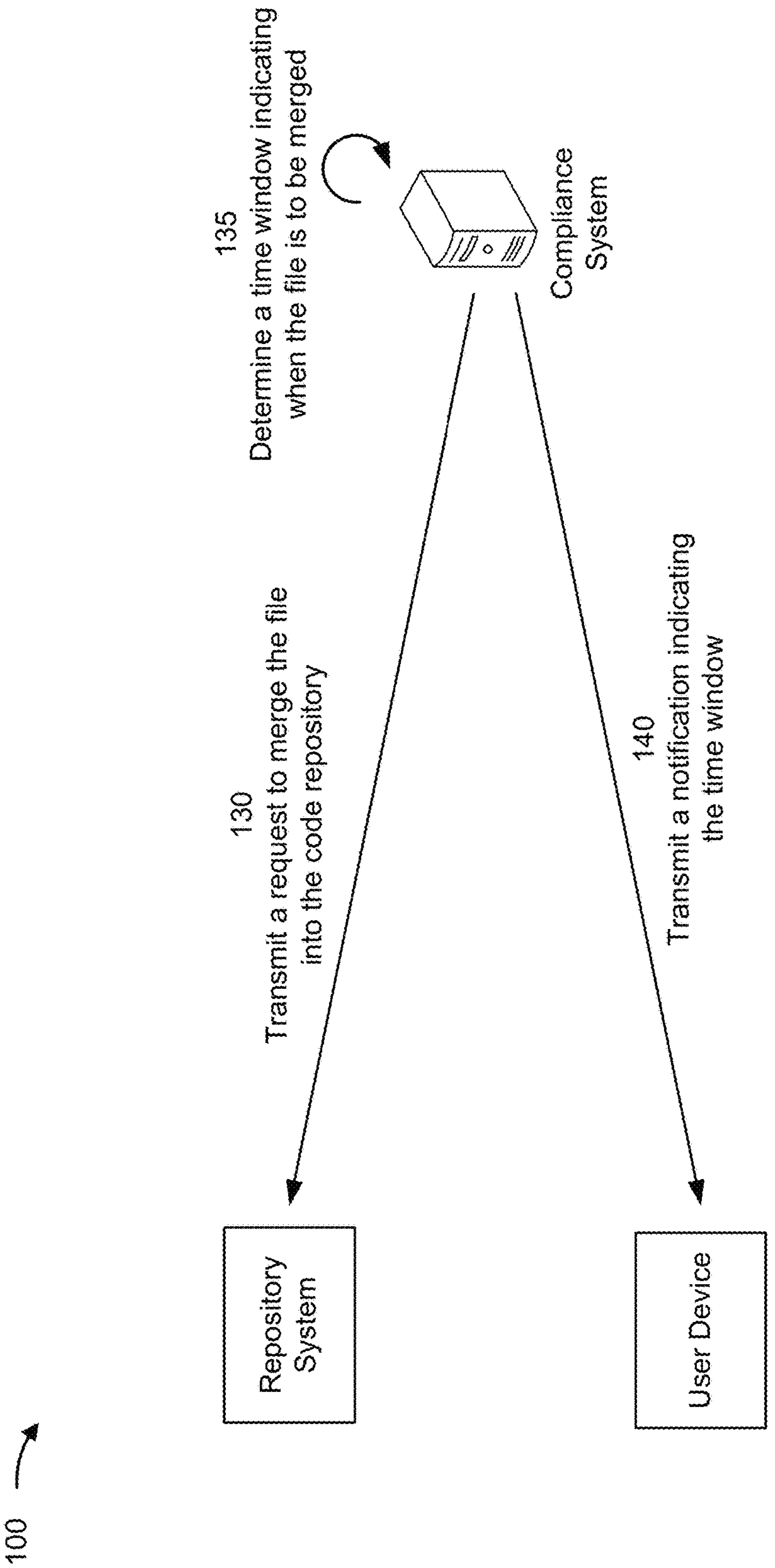

As shown in FIG. 1D, and by reference number 130, the compliance system may transmit a request (e.g., a pull request) to merge the file(s) that have been modified into the code repository. For example, the request may be to merge the clone of the code repository, that includes the modified file(s), into the code repository. The compliance system may transmit the request based on a determination that the build of the code of the code repository is likely to pass if the modified file(s) are used. Additionally, or alternatively, the request may indicate the recommendation of the modification (e.g., rather than the notification indicating the recommendation being transmitted).

In some implementations, the compliance system may transmit the request to the repository system, which may cause the repository system to provide a notification of the request to a user (e.g., a developer, a manager, a custodian, or the like) associated with the code repository. Alternatively, the compliance system may transmit the request directly to a user device of the user. In some implementations, the request may include an indication that the request is to be automatically approved (e.g., because the modifications to the content of the files(s) was made by a computer rather than by a human), to thereby cause automatic approval of the request upon receipt by the repository system. In some implementations, rather than transmitting the request, the compliance system may cause the file(s) that have been modified to be automatically merged (e.g., without approval) into the code repository.

As shown by reference number 135, the compliance system may determine a severity of the at least one violation. The compliance system may determine the severity as a severity classification (e.g., "not severe," "low severity," "moderate severity," or "high severity") and/or a severity score (e.g., on a scale from 1 to 10 or from 1 to 100). In some implementations, the compliance system may determine the severity of the at least one violation using a machine learning model (e.g., a different machine learning model than the machine learning model used to determine whether the build of the code is likely to pass). For example, the machine learning model may be trained to output the severity based on an input indicating the at least one violation and/or the content of the file(s). In some implementations, the machine learning model may be trained using an unsupervised learning technique. Training data used for training the machine learning model may include historical data indicating historical violations, historical corrections of the violations (e.g., by modification of file contents), and historical time lengths for implementing the corrections (e.g., a time length between a first time when a request to merge a corrected file into a code repository is generated and a second time when the merge is implemented).

As shown by reference number 140, the compliance system may transmit a notification indicating the severity of the at least one violation. The notification may also indicate the code repository, the file(s) that were modified, a type of the at least one violation, and/or an identifier of, or a link to, the request to merge the file(s) into the code repository. The compliance system may transmit the notification to a user device. The user device may be associated with a user (e.g., a developer, a manager, a custodian, or the like) of the code repository that may then act upon the request to merge the file(s) into the code repository. In some implementations, the compliance system may determine (e.g., using the machine learning model) a recommendation of a deadline (e.g., a quantity of days or a particular date) by which the request to merge the file(s) is to be acted upon based on the severity of the at least one violation. Here, the notification may also indicate the recommendation of the deadline.

In addition, or as an alternative, to transmitting the notification, the compliance system may perform one or more automatic actions based on the severity of the at least one violation. For example, the compliance system may perform the one or more automatic actions if a severity classification associated with the at least one violation is a particular classification and/or if a severity score associated with the at least one violation satisfies a threshold. In some implementations, an action may include causing deletion of the code repository (e.g., by transmitting a request to delete the code repository to the repository system). For example, the compliance system may cause deletion of the code repository if the request to merge the file(s) has not been acted upon within a particular time period after the request was transmitted. In some implementations, the compliance system may cause deletion of the code repository instead of modifying the content of the file(s) and transmitting the request to merge the file(s). Additionally, or alternatively, an action may include generating (e.g., opening) an incident report relating to the at least one violation (e.g., in an incident management system of the entity). The incident report may indicate similar information to the notification described above. However, the incident report may indicate that the request to merge the file(s) should be acted upon immediately.

The infrastructure may be provisioned in the cloud computing environment using the modified file(s) in the code repository. For example, the infrastructure may be provisioned in the cloud computing environment after the modified file(s) have been merged into the code repository. In some implementations, the compliance system or another system may cause provisioning of the infrastructure in the cloud computing environment using the modified file(s) in the code repository. For example, the compliance system or the other system may provide the file(s), or provide an indication of an infrastructure configuration based on the file(s), to a deployment application that communicates (e.g., via an API) the infrastructure configuration, as defined in the file(s), to a cloud computing provider that is to implement the infrastructure in the cloud computing environment.

By proactively detecting and correcting violations of the compliance rules before the infrastructure is provisioned to the cloud computing environment, a performance of cloud computing resources may be improved. Moreover, by proactively detecting and correcting non-compliant infrastructure before the infrastructure is provisioned in the cloud computing environment, a security of the infrastructure and/or a stability of the infrastructure is improved.

While the foregoing is described in terms of correction of IaC files in a code repository, the techniques described herein may be used in connection with correction of other types of files that may be included in a code repository. For example, other types of files that may be modified to comply with compliance rules may include frontend website files, backend website files, and/or mobile application files, among other examples.

As indicated above, FIGS. 1A-1D are provided as an example. Other examples may differ from what is described with regard to FIGS. 1A-1D.

Figure 2:
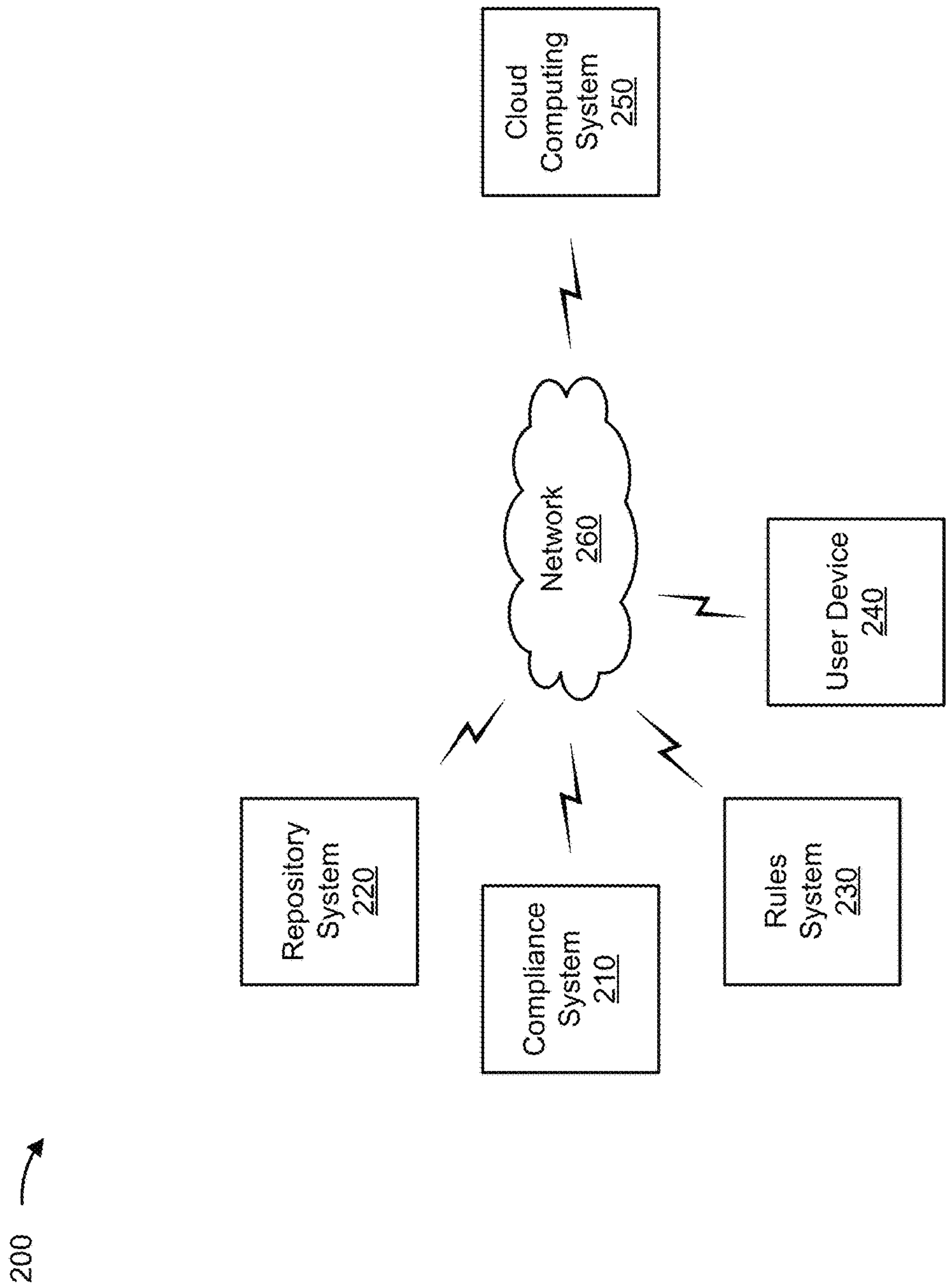
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a compliance system 210, a repository system 220, a rules system 230, a user device 240, a cloud computing system 250, and a network 260. Devices of environment 200 may interconnect via wired connections, wireless connections, or a combination of wired and wireless connections.

The compliance system 210 includes one or more devices capable of receiving, generating, storing, processing, providing, and/or routing information associated with correction of non-compliant files in a code repository, as described elsewhere herein. The compliance system 210 may include a communication device and/or a computing device. For example, the compliance system 210 may include a server, such as an application server, a client server, a web server, a database server, a host server, a proxy server, a virtual server (e.g., executing on computing hardware), or a server in a cloud computing system. In some implementations, the compliance system 210 includes computing hardware used in a cloud computing environment.

The repository system 220 includes one or more devices capable of receiving, generating, storing, processing, and/or providing information associated with one or more code repositories, as described elsewhere herein. The repository system 220 may include a communication device and/or a computing device. For example, the repository system 220 may include a server, such as an application server, a client server, a web server, a database server, a host server, a proxy server, a virtual server (e.g., executing on computing hardware), or a server in a cloud computing system. In some implementations, the repository system 220 includes computing hardware used in a cloud computing environment.

The rules system 230 includes one or more devices capable of receiving, generating, storing, processing, and/or providing information associated with compliance rules, as described elsewhere herein. The rules system 230 may include a communication device and/or a computing device. For example, the rules system 230 may include a server, such as an application server, a client server, a web server, a database server, a host server, a proxy server, a virtual server (e.g., executing on computing hardware), or a server in a cloud computing system. In some implementations, the rules system 230 includes computing hardware used in a cloud computing environment.

The user device 240 includes one or more devices capable of receiving, generating, storing, processing, and/or providing information associated with correction of non-compliant files in a code repository, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 250 includes one or more devices capable of receiving, generating, storing, processing, and/or providing (e.g., deploying) cloud computing services, as described elsewhere herein. The cloud computing system 250 may include a communication device and/or a computing device. For example, the cloud computing system 250 may include a server, an application server, a client server, a web server, a database server, a host server, a proxy server, a virtual server (e. g., executing on computing hardware), a device that includes computing hardware used in a cloud computing environment, or a similar type of device. The cloud computing system 250 may communicate with one or more other devices of environment 200, as described elsewhere herein.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
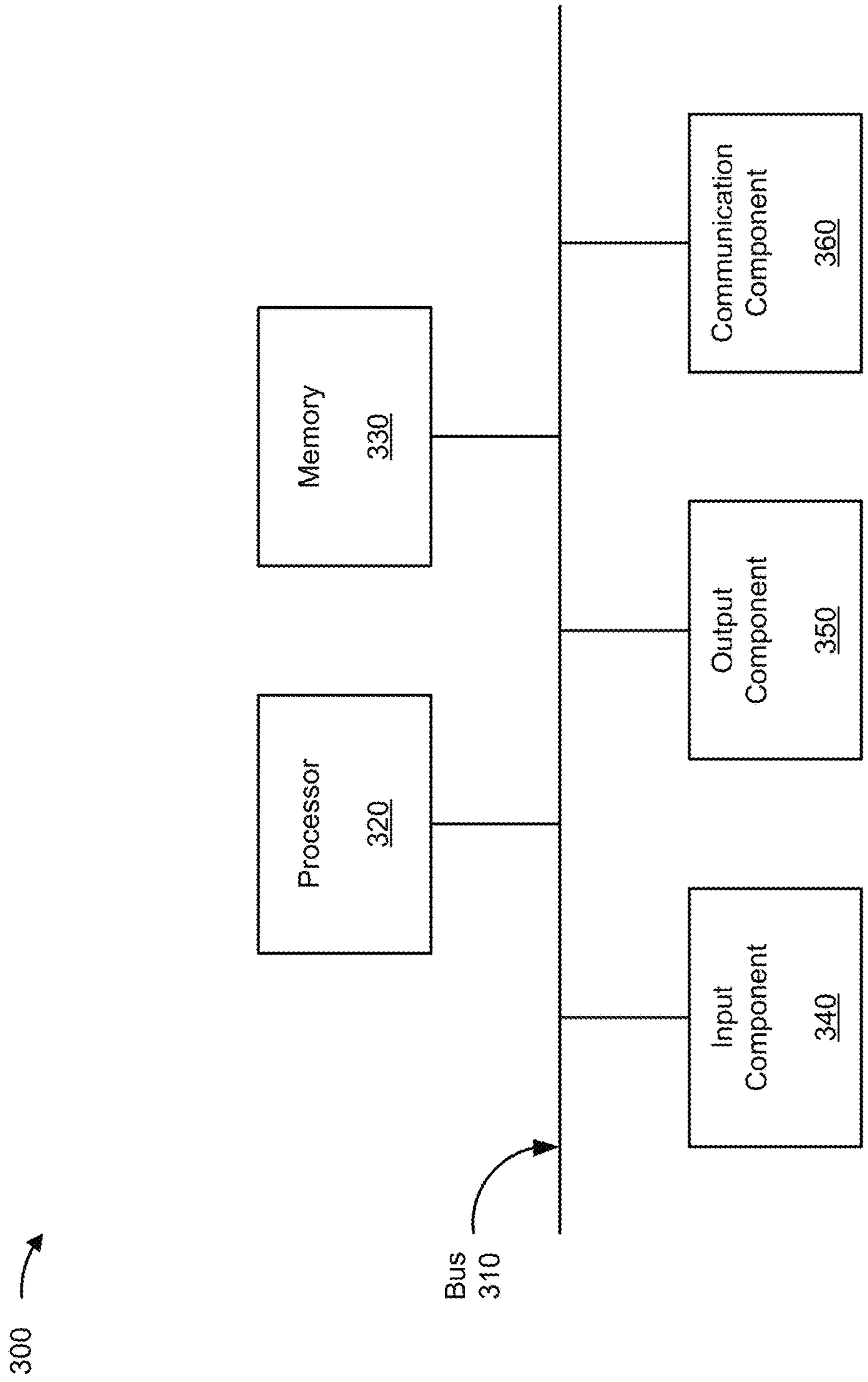
FIG. 3 is a diagram of example components of a device associated with correction of non-compliant files in a code repository, in accordance with some embodiments of the present disclosure.

FIG. 3 is a diagram of example components of a device 300 associated with correction of non-compliant files in a code repository. Device 300 may correspond to compliance system 210, repository system 220, rules system 230, user device 240, and/or cloud computing system 250. In some implementations, compliance system 210, repository system 220, rules system 230, user device 240, and/or cloud computing system 250 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
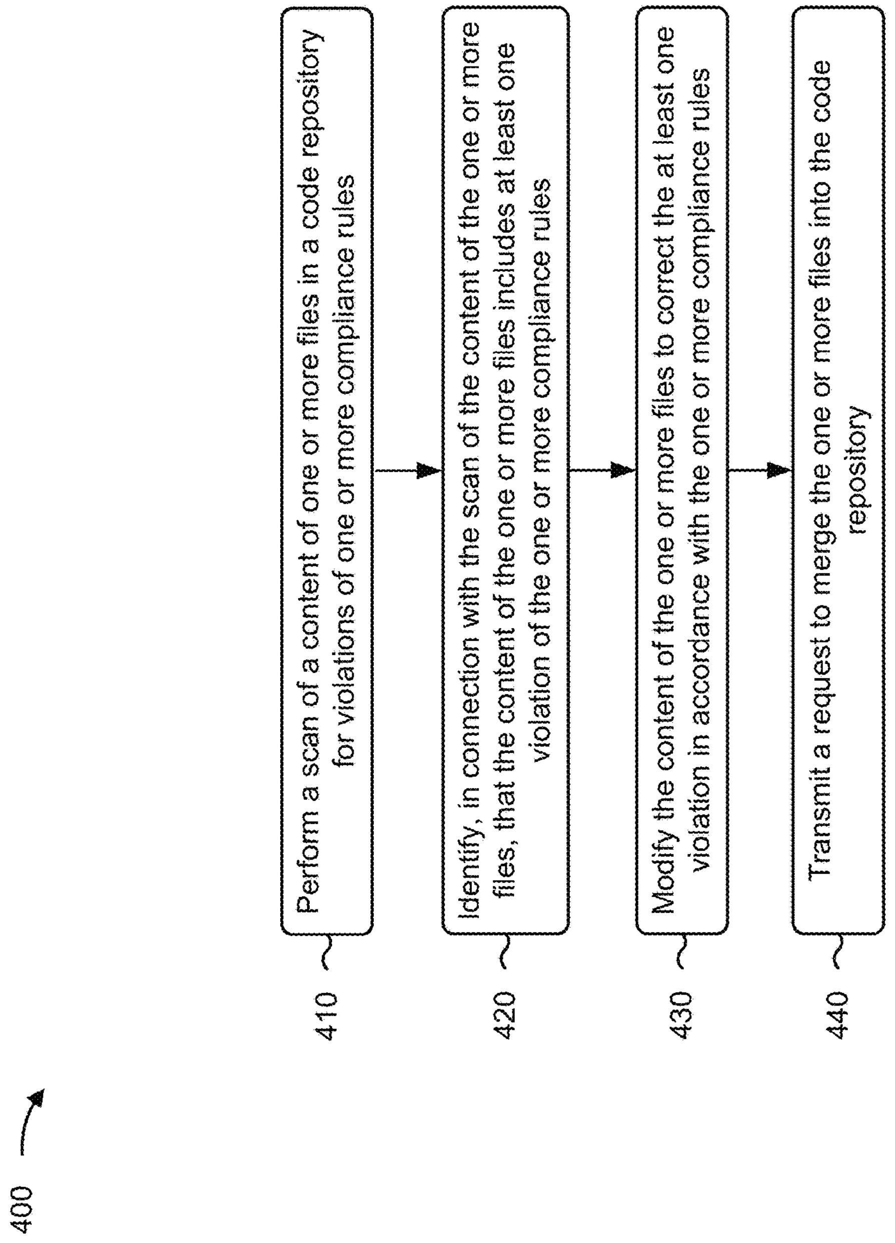
FIG. 4 is a flowchart of an example process associated with correction of non-compliant files in a code repository, in accordance with some embodiments of the present disclosure.

FIG. 4 is a flowchart of an example process 400 associated with correction of non-compliant files in a code repository. In some implementations, one or more process blocks of FIG. 4 may be performed by the compliance system 210. In some implementations, one or more process blocks of FIG. 4 may be performed by another device or a group of devices separate from or including the compliance system 210, such as the repository system 220, the rules system 230, the user device 240, and/or the cloud computing system 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include performing a scan of a content of one or more files in a code repository for violations of one or more compliance rules (block 410). For example, the compliance system 210 (e.g., using processor 320 and/or memory 330) may perform a scan of a content of one or more files in a code repository for violations of one or more compliance rules, as described above in connection with reference number 115 of FIG. 2B. As an example, the compliance system 210 may perform validation of the one or more files based on the one or more compliance rules. In some implementations, the one or more files indicate a configuration for infrastructure that is to be provisioned in a cloud computing environment. In some implementations, the scan uses natural language processing to identify one or more of a cloud computing provider for the cloud computing environment or a programming language used in the one or more files.

As further shown in FIG. 4, process 400 may include identifying, in connection with the scan of the content of the one or more files, that the content of the one or more files includes at least one violation of the one or more compliance rules (block 420). For example, the compliance system 210 (e.g., using processor 320 and/or memory 330) may identify, in connection with the scan of the content of the one or more files, that the content of the one or more files includes at least one violation of the one or more compliance rules, as described above in connection with reference number 120 of FIG. 1B. As an example, the compliance system 210 may identify that the content of the one or more files includes at least one violation of the one or more compliance rules based on the cloud computing provider and/or the programming language.

As further shown in FIG. 4, process 400 may include modifying the content of the one or more files to correct the at least one violation in accordance with the one or more compliance rules (block 430). For example, the compliance system 210 (e.g., using processor 320 and/or memory 330) may modify the content of the one or more files to correct the at least one violation in accordance with the one or more compliance rules, as described above in connection with reference number 125 of FIG. 1C. As an example, modifying the content may include deleting a portion of the content, masking a portion of the content, editing a portion of the content, or rearranging a portion of the content.

As further shown in FIG. 4, process 400 may include transmitting a request to merge the one or more files into the code repository (block 440). For example, the compliance system 210 (e.g., using processor 320, memory 330, and/or communication component 360) may transmit a request to merge the one or more files into the code repository, as described above in connection with reference number 130 of FIG. 1C. As an example, the compliance system 210 may transmit the request based on a determination that a build of the code of the code repository is likely to pass if the modified file(s) are used.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A compliance system for correction of non-compliant files in a code repository, the compliance system comprising:
- one or more memories; and
- one or more processors, coupled to the one or more memories, configured to:
  - obtain, from a repository system, first information relating to the code repository that includes one or more files that indicate a configuration for infrastructure that is to be provisioned in a cloud computing environment;
  - obtain, from a rules system different from the repository system, second information relating to one or more compliance rules for provisioning the infrastructure in the cloud computing environment;
  - identify, using natural language processing, at least one of a cloud computing provider for the cloud computing environment or a programming language used in the one or more files;
  - determine, based on the at least one of the cloud computing provider or the programming language, a parsing scheme;
  - perform, using the parsing scheme, a scan of a content of the one or more files for one or more violations of the one or more compliance rules;
  - identify, in connection with the scan of the content of the one or more files and based on the at least one of the cloud computing provider or the programming language, that the content of the one or more files includes at least one violation of the one or more violations;
  - modify the content of the one or more files to correct the at least one violation in accordance with the one or more compliance rules,
    - wherein modifying the content of the one or more files includes at least one of deleting, rearranging, or editing a portion of the content of the one or more files associated with the at least one violation;
  - transmit, to the repository system and after modifying the content of the one or more files, a request to merge modified content of the one or more files into the code repository;
  - determine, using a machine learning model and based on the at least one violation, a severity of the at least one violation; and
  - transmit, to a user device different from the repository system and associated with a user of the code repository, a notification indicating the severity of the at least one violation.

2. The compliance system of claim 1,
wherein the machine learning model is trained to determine the severity of the at least one violation based on data indicating historical time lengths for implementing corrections of the one or more violations of the one or more compliance rules.

3. The compliance system of claim 1, wherein the first information is obtained responsive to detecting creation of the code repository.

4. The compliance system of claim 1, wherein the one or more processors, to modify the content of the one or more files, are configured to:

delete the portion of the content of the one or more files associated with the at least one violation.

5. The compliance system of claim 1, wherein the one or more processors, to modify the content of the one or more files, are configured to:

determine a change, to the portion of the content of the one or more files associated with the at least one violation, that corrects the at least one violation in accordance with the one or more compliance rules, wherein the change includes the at least one of deleting, rearranging, or editing the portion of the content of the one or more files; and modify the portion of the content of the one or more files associated with the at least one violation in accordance with the change.

6. The compliance system of claim 1, wherein the infrastructure is a server, a serverless computing function, a load balancer, a volume, or a database.

7. The compliance system of claim 1, wherein the one or more files include at least a first file and a second file, and wherein a file type of the first file is different from a file type of the second file.

8. The compliance system of claim 1, wherein the one or more processors are further configured to:

determine, based on the severity of the at least one violation, a recommendation of a deadline by which the request to merge the one or more files is to be acted upon, wherein the notification indicating the severity of the at least one violation further indicates the recommendation of the deadline.

9. The compliance system of claim 1, wherein the request to merge the modified content includes a pull request to merge a clone of the code repository that includes the modified content into the code repository.

10. A method of correction of non-compliant files in a code repository, comprising:

obtaining, by a device and from a repository system, first information relating to the code repository that includes one or more files that indicate a configuration for infrastructure that is to be provisioned in a cloud computing environment;

obtaining, by the device and from a rules system different from the repository system, second information relating to one or more compliance rules for provisioning the infrastructure in the cloud computing environment;

identifying, by the device and using natural language processing, at least one of a cloud computing provider for the cloud computing environment or a programming language used in the one or more files;

determining, by the device and based on the at least one of the cloud computing provider or the programming language, a parsing scheme;

performing, by the device and using the parsing scheme, a scan of a content of the one or more files for one or more violations of the one or more compliance rules;

identifying, by the device in connection with the scan of the content of the one or more files and based on the at least one of the cloud computing provider or the programming language, that the content of the one or more files includes at least one violation of the one or more violations;

modifying, by the device, the content of the one or more files to correct the at least one violation in accordance with the one or more compliance rules, wherein modifying the content of the one or more files includes at least one of deleting, rearranging, or editing a portion of the content of the one or more files associated with the at least one violation;

determining, by the device using a machine learning model, a probability as to whether a build of code of the code repository, using the one or more files with the content of the one or more files that is modified, is likely to pass; and transmitting, by the device, to the repository system, based on the probability that the build of code of the code repository is likely to pass, a request to merge the one or more files into the code repository.

11. The method of claim 10, wherein the at least one violation is a reference to a security group using an outdated release version.

12. The method of claim 10, further comprising:

determining, using an additional machine learning model and based on the at least one violation, a severity of the at least one violation; and transmitting, to a user device associated with a user of the code repository, a notification indicating the severity of the at least one violation.

13. The method of claim 10, wherein modifying the content of the one or more files comprises:

deleting the portion of the content of the one or more files associated with the at least one violation.

14. The method of claim 10, wherein modifying the content of the one or more files comprises:

determining a change, to the portion of the content of the one or more files associated with the at least one violation, that corrects the at least one violation in accordance with the one or more compliance rules, wherein the change includes the at least one of deleting, rearranging, or editing the portion of the content of the one or more files associated with the at least one violation; and modifying the portion of the content of the one or more files associated with the at least one violation in accordance with the change.

15. The method of claim 10, wherein the one or more files are multiple files across multiple code repositories associated with an entity, and wherein the scan is of the content of the multiple files across the multiple code repositories.

16. A non-transitory computer-readable medium storing a set of instructions for correction of non-compliant files in a code repository, the set of instructions comprising:

one or more instructions that, when executed by one or more processors of a device, cause the device to:

obtain, from a repository system, first information relating to the code repository that includes one or more files that indicate a configuration for infrastructure that is to be provisioned in a cloud computing environment;

obtain, from a rules system different from the repository system, second information relating to one or more compliance rules for provisioning the infrastructure in the cloud computing environment;

identify, using natural language processing, at least one of a cloud computing provider for the cloud computing environment or a programming language used in the one or more files;

determine, based on the at least one of the cloud computing provider or the programming language, a parsing scheme;

perform, using the parsing scheme, a scan of a content of the one or more files for one or more violations of the one or more compliance rules;

identify, in connection with the scan of the content of the one or more files and based on the at least one of the cloud computing provider or the programming language, that the content of the one or more files includes at least one violation of the one or more violations;

modify the content of the one or more files to correct the at least one violation in accordance with the one or more compliance rules, wherein modifying the content of the one or more files includes at least one of deleting, rearranging, or editing a portion of the content of the one or more files associated with the at least one violation; and transmit, to the repository system, a request to merge the one or more files into the code repository.

17. The non-transitory computer-readable medium of claim 16, wherein the one or more instructions, when executed by the one or more processors, further cause the device to:

determine, using a machine learning model, a recommendation of a modification to the content of the one or more files, wherein the machine learning model is trained to determine the modification based on data indicating whether previous builds of code have passed or failed; and transmit, to a user device associated with a user of the code repository, an additional notification indicating the recommendation of the modification.

18. The non-transitory computer-readable medium of claim 16, wherein the one or more instructions, when executed by the one or more processors, further cause the device to:

cause provisioning of the infrastructure in the cloud computing environment using the one or more files with the content of the one or more files that is modified.

19. The non-transitory computer-readable medium of claim 16, wherein the one or more instructions, that cause the device to modify the content of the one or more files, cause the device to:

delete the portion of the content of the one or more files associated with the at least one violation.

20. The non-transitory computer-readable medium of claim 16, wherein the one or more instructions, that cause the device to modify the content of the one or more files, cause the device to:

determine a change, to the portion of the content of the one or more files associated with the at least one violation, that corrects the at least one violation in accordance with the one or more compliance rules, wherein the change includes the at least one of deleting, rearranging, or editing the portion of the content of the one or more files associated with the at least one violation; and modify the portion of the content of the one or more files associated with the at least one violation in accordance with the change.

* * * * *